United States Patent
Larsson

(10) Patent No.: US 8,885,452 B2
(45) Date of Patent: Nov. 11, 2014

(54) METHOD AND SYSTEM OF COMMUNICATION OVER CHANNELS OF DIVERSE CHANNEL CHARACTERISTICS

(75) Inventor: Peter Larsson, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2134 days.

(21) Appl. No.: 11/577,069

(22) PCT Filed: Oct. 11, 2004

(86) PCT No.: PCT/SE2004/001461
§ 371 (c)(1),
(2), (4) Date: Sep. 8, 2009

(87) PCT Pub. No.: WO2006/041339
PCT Pub. Date: Apr. 20, 2006

(65) Prior Publication Data
US 2009/0316567 A1 Dec. 24, 2009

(51) Int. Cl.
*H04J 1/12* (2006.01)

(52) U.S. Cl.
USPC .......... 370/201; 370/329; 455/452.2

(58) Field of Classification Search
None
See application file for complete search history.

(56) References Cited

U.S. PATENT DOCUMENTS

| | | | |
|---|---|---|---|
| 5,726,978 A * | 3/1998 | Frodigh et al. | 370/252 |
| 6,400,783 B1 | 6/2002 | Cusani | |
| 6,546,045 B1 | 4/2003 | Benson, Jr. | |
| 7,715,358 B2 * | 5/2010 | Li et al. | 370/344 |
| 2002/0122383 A1 * | 9/2002 | Wu et al. | 370/210 |
| 2002/0183086 A1 | 12/2002 | Hellmark et al. | |
| 2004/0114506 A1 * | 6/2004 | Chang et al. | 370/208 |
| 2005/0141624 A1 * | 6/2005 | Lakshmipathi et al. | 375/260 |
| 2005/0282550 A1 * | 12/2005 | Cho et al. | 455/447 |
| 2006/0160550 A1 * | 7/2006 | Edwards | 455/509 |
| 2012/0069755 A1 * | 3/2012 | Li et al. | 370/252 |

OTHER PUBLICATIONS

G. Foschini, "Layered Space-Time Architecture for Wireless Communication in a Fading Environment When Using Multi-Element Antennas", Bell Labs Technical Journal, Autumn 1996.
C. Schlegel, Zachary Bagley, "Efficient Processing for High-Capacity MIMO Channels" MIMO Channels and Space-Time Coding, WOC 2002, Jul. 2002.
Siavash M. Alamouti, "A Simple Transmit Diversity Technique for Wireless Communications", IEEE Journal on Sel. Areas in Communications, Oct. 1998.

* cited by examiner

*Primary Examiner* — Mohammad Adhami

(57) ABSTRACT

The present invention relates to communications. More especially it relates to multiple access communications over channels of diverse channel characteristics, e.g. coherence time or rate of time variations. Particularly it relates to traffic distribution and channel allocation for efficient communications over such channels.

8 Claims, 2 Drawing Sheets

METHOD AND SYSTEM OF COMMUNICATION OVER CHANNELS OF DIVERSE CHANNEL CHARACTERISTICS

TECHNICAL FIELD OF THE INVENTION

The present invention relates to communications. More especially it relates to multiple access communications over channels of diverse channel characteristics, e.g. coherence time or rate of time variations. Such channels are prevalent in wireless communications, radio communications included. Particularly the inventions relates to traffic distribution and channel allocation for efficient communications over such channels.

BACKGROUND AND DESCRIPTION OF RELATED ART

Multiple Access Communications are previously known. In e.g. mobile communications systems such as GSM (Global System for Mobile Communications) or UMTS (Universal Mobile Telecommunications System) users or user equipment are allocated communications resources depending on demand and availability.

Multiple Access Communications usually relies upon multiplexing technologies for dividing or splitting a channel resource into components of more limited capacity. Examples of such technologies are FDM (Frequency Divisions Multiplex), TDM (Time Division Multiplex) and CDM (Code Division Multiplex) with associated multiple access technologies FDMA (Frequency Division Multiple Access), TDMA (Time Division Multiple Access) and CDMA (Code Division Multiple Access) respectively. According to prior art, users are multiplexed by dividing an entire bandwidth resource into channels or channel resources characterized by orthogonality in frequency, time and code domain, respectively. Also known in prior art are multiplexing systems combining two or more of FDM, TDM and CDM thereby achieving channels or channel resources characterized by orthogonality in two or more domains, e.g. time and frequency domain.

Prior art recognizes both circuit switched communications and packet switched communications. In circuit switched communications, communications resources are allocated, even if they temporarily or due to channel conditions could be released, for an entire communications session, e.g. an entire phone call or an entire telephone modem data connection of one or more data transfers. In packet switched communications, communications resources are allocated according to communications requirements for distribution of packets not necessarily forming an entire communications session, e.g. a fraction of a digitized spoken sentence or a fraction of a data file.

Varying channel characteristics, e.g. interference, of prior art systems are compensated for by particularly transmission power control and channel equalization. If received signal strength so mandates, channel handover may be initiated.

There are also known prior art systems for exploring channel dynamics, such as MIMO (Multiple Input Multiple Output) MISO (Multiple Input Single Output) and SIMO (Single Input Multiple Output). In such systems, channel state information is typically fed back from receiver to transmitter.

From prior art channel probing is also previously known. When an HF (High Frequency) channel is probed for optimum frequency of operation or a radio communications channel is probed for appropriate transmission power level, it is an example of channel probing.

U.S. Patent Application US2002/0183086 discloses channel probing in a CDMA system. A mobile station increases transmission power level until a base station acknowledgement is received. The power level at which an acknowledgement is received is stored and forms a basis for the power level at which a second probe is initiated, thereby reducing time to acknowledgement of second probe.

U.S. Pat. No. 6,546,045 reveals channel probing in a communications system for selection of one out of two available modulation schemes. A probe signal is transmitted for estimation of channel multipath and Doppler characteristics. Adaptive modems measure the communication channel's Doppler and multipath characteristics. Upon the occurrence of predetermined criteria, the channel scattering function estimate may be updated and a new modulation scheme may be selected to continue transmission.

U.S. Pat. No. 6,400,783 reveals channel probing in a communications system for channel estimation and channel equalization.

G. Foschini, '*Layered Space-Time Architecture for Wireless Communication in a Fading Environment When Using Multi-Element Antennas,*' Bell Labs Technical Journal, Autumn 1996, addresses digital communication in a Rayleigh fading environment and analyzes $(n_T, n_R)$-systems with $n_T$ transmit antenna elements and $n_R$ receive antenna elements. The architecture has also been marketed as BLAST ('Bell Layered Space-Time Architecture').

C. Schlegel, Z Bagley, '*Efficient Processing for High-Capacity MIMO Channels*' JSAC, MIMO Systems Special Issue, Apr. 23, 2002, and C. Schlegel, Zachary Bagley, 'MIMO Channels and Space-Time Coding, WOC 2002, July 2002, presents fundamental results and methods for capacity for MIMO, discusses ray-tracing channel models and realizable capacity, discusses error performance measures and decoding algorithms for space-time coding and the addition of error control coding to space-time systems.

Siavash M. Alamouti, '*A Simple Transmit Diversity Technique for Wireless Communications,*' IEEE Journal on Sel. Areas in Communications, October 1998, discloses a two-branch transmit diversity scheme. Diversity gain in Rayleigh fading is demonstrated with two transmit antennas and with coding over two symbol intervals.

None of the cited documents above discloses channel characteristic dependent channel allocation, grouping users of different channel characteristics into disjoint groups. None of the cited documents discloses users of different groups being allocated non-interfering channels or channels of more limited interference than the mutual interference between channels within a group. Example channels are orthogonal channels, which can be achieved by means of, e.g., frequency orthogonality, non-overlapping transmission time intervals or orthogonal codes.

SUMMARY OF THE INVENTION

A general problem of today's wireless multiple access communications systems is user interference and scarce communications resources.

Communications systems are designed to provide good system capacity which is traded with, among other things, interference between communication links of different users. To provide satisfactory or good performance, many communications systems benefit from information feedback from receiver to transmitter. The frequency of feedback transmissions is related to the change rate of channel characteristics of the communication link. The feedback transmissions occupy scarce transmission resources in terms of, e.g., channel bandwidth or payload data transmission capacity and transmission power or energy.

Consequently, there is a need of keeping interference levels low, while providing high capacity, reducing transmission feedback and keeping the frequency of feedback transmissions small.

It is consequently an object of the present invention to reduce feedback rate for communication link adaptation or eliminate feedback for this purpose.

A further object is to minimize or reduce communications power or energy consumption due to transmission of feedback messages.

It is also an object to reduce or eliminate allocation of scarce communications resources for transmission of feedback or feedback-related control information.

Another object is to free scarce communication resources thereby enabling an increased amount of transmissions of payload data.

Finally, it is an object to adjust or adapt link communications rate sensitivity to channel characteristics change rate.

These objects are met by a method and system of communications resource allocation dependent on channel characteristics change rate of communication links comprising link grouping.

DESCRIPTION OF PREFERRED EMBODIMENTS

Figure 1:
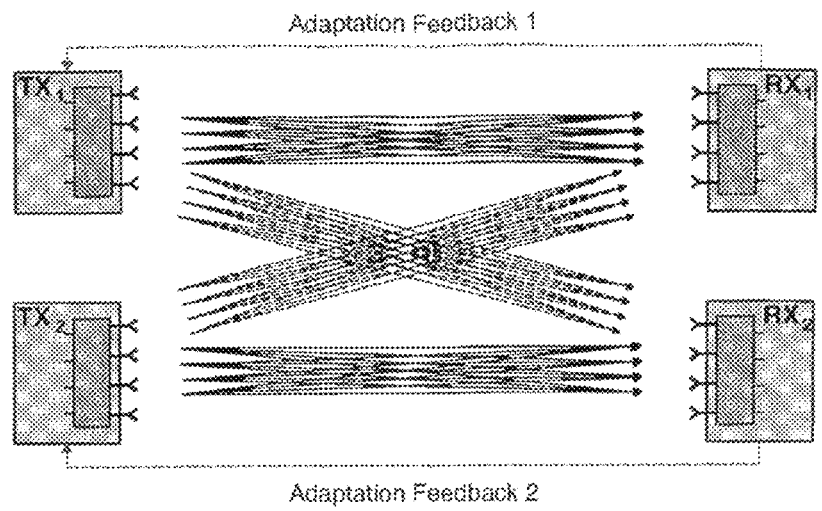
FIG. 1 illustrates the problem, solved by the invention, of different channel characteristics change rate for two interfering communication links of an MIMO communications system.

Channel characteristics fluctuations, e.g. in terms of coherence time, depend on the speed with which moving mobile users move for mobile wireless communications. In wireless communications, channel characteristics also depend on the speed with which moving objects in the radio environment move.

Performance of modern communications systems generally benefit from feedback information. With transmission power control, transmission power is adjusted in accordance with received power or energy level and received power or energy level of interfering signals. Multiple-antenna systems depend on appropriate channel-dependent weighting of signals to/from various antennas of an antenna array, e.g.

Considering feedback of channel state information, rapidly varying channels require frequent updates on channel state, whereas slowly varying channels no or little additional information is provided by frequent updates for which reason less frequent channel state updates provide required channel state information for proper operations.

A problem in prior art systems, however, is that communications on channels, otherwise slowly varying are allowed to be affected by communications on rapidly varying channels. This is, e.g., the case with co-channel interference of cellular communications systems, where frequency-reuse is adopted and the frequency range of communications on a slowly varying channel is interfered by communications in a cell a reuse-distance apart. When the interfering communications are varying rapidly, also the channel characteristics of the otherwise slowly varying communication channel becomes rapidly varying, at least to some extent, and more frequent updates of channel state information, for transmission power control, e.g., will be required. This strained requirement on channel state updates loads the feedback channel, and considering a whole system it loads scarce radio channel resources. There are numerous situations where rapidly varying interference, particularly co-channel interference but to some extent also interference from neighboring channels, convert otherwise slowly varying channels to rapidly varying channels. An example situation when this problem arises is when a transmitting entity controls its transmission power in relation to a swiftly moving receiver, and the transmission power required to compensate for fast fluctuating channel attenuation. The swiftly moving receiver thereby induces fast varying interference at another non-moving example receiver. In TDM systems users of different propagation time delay to a common base station may interfere, as may users communicating with different base stations due to propagation time delay conditions causing time slots to overlap. In CDM systems users of quasi-orthogonal codes interfere to some extent when the codes are not perfectly orthogonal or distance to base station causes different users to transmit with substantially different transmission power (the near-far problem) and so on.

The identified problem is a source of unnecessary energy consumption and waste of channel resources.

Figure 2:
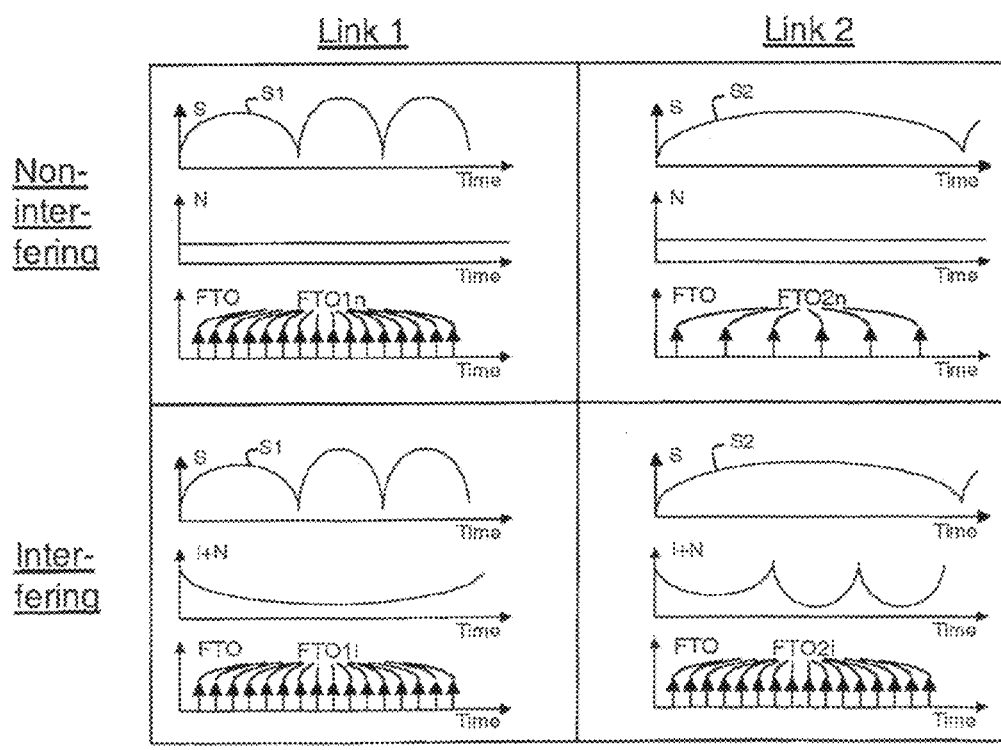
FIG. 2 illustrates received signal, interference and noise levels of two communication links together with required feedback rate to accommodate channel characteristics change rate, according to prior art.

FIG. 1 illustrates the problem for two interfering communication links of an MIMO communications system. Ideally a first transmitter <<TX1>> would communicate with a first receiver <<RX1>> without interfering with other communication links. In the figure the communication link between the first transmitter <<TX1>> and first receiver <<RX1>> incidentally shows rapidly varying channel characteristics resulting in rapidly varying received signal level <<S>>, <<S1>> illustrated in FIG. 2 at the receiving antenna of the receiver <<RX1>> in FIG. 1. The rapidly varying channel characteristics can be due to the first receiver moving around rapidly. Another example reason for rapidly varying channel characteristics is cars or aircrafts or other rapidly moving objects causing radio wave reflections significantly contributing to the signal received at the receiver. Feedback information <<Adaptation Feedback 1>> is sent from the receiver <<RX1>> to the transmitter <<TX1>>. In FIG. 2 transmissions of feedback information <<FTO>> is indicated by arrows at the time instances of transmission <<FTO1$n$>>, <<FTO1$i$>>. A second communication link is established between a second transmitter <<TX2>> and a second receiver <<RX2>>. Also the example second communication link relies upon feedback information <<Adaptation Feedback 2>> with related feedback transmission occurrences <<FTO>>, <<FTO2$n$>>, <<FTO2$i$>>. Ideally this communication link would not be subject to interference from other communication links but only to noise <<N>> and would then be slowly varying as illustrated in FIG. 2 for one receiving antenna of the second receiver <<RX2>> in FIG. 1. The feedback transmission occurrences could then be set smaller for the second communication link <<FTO2n>> compared to the first communication link <<FTO1n>> as explained above. However, the ideal situation with non-interfering communication links does not prevail if not accommodated for, and the communication links interfere with each other <<I+N>>. The interference from the second transmitter <<TX2>> to the first receiver <<RX1>> is compensated for by the high frequency channel state updates <<FTO1i>> required also in prior art solutions due to rapidly varying received power <<S1>>. As identified by the inventor, however, the interference from the first transmitter <<TX1>> to the second receiver <<RX2>> impacts performance severely unless the frequency of channel state updates is increased <<FTO2i>>, or the interference is accommodated for according to the invention, in relation to what would have been required <<FTO2n>> in absence of the rapidly varying interference.

The problem could be illustrated mathematically, using versatile terminology of MIMO communications with $H_{ij}$ being matrix representation of channel transfer function to receiver i from transmitter j, it is valid also for single element receiving or transmitting antennas reducing dimensionality to one where appropriate. Received signals $R_1$, and $R_2$ in vector representation at the first and second receivers, respectively, are $$R_1 = H_{11}V_1S_1 + N_1 + I_2, \text{ and}$$

$$R_2 = H_{22}V_2S_2 + N_2 + I_1, \text{ where}$$

$V_1$ and $V_2$ are transmitter weighting matrices at the first and second transmitter <<TX1>>, <<TX2>> respectively, $S_1$ and $S_2$ are the signal vectors transmitted by the first and second transmitter, respectively, $N_1$ and $N_2$ are the noise vectors at the first and second receiver, respectively, and $I_1$ and $I_2$ are the interference vectors representing received interference from the first and second transmitter <<TX1>>, <<TX2>>, respectively. The interference can similarly be expressed $$I_1 = H_{21}V_1S_1, \text{ and}$$

$$I_2 = H_{12}V_2S_2.$$

At the receiver transmitted data is estimated $$\hat{S}_1 = U_1^H R_1, \text{ and}$$

$$\hat{S}_2 = U_2^H R_2, \text{ where}$$

$\hat{S}_1$ and $\hat{S}_2$ are estimated data vectors at the first and second receivers <<RX1>>, <<RX2>>, respectively, and $U_1^H = (U_1^*)^T$ and $U_2^H = (U_2^*)^T$ are Hermitian transposed, or equivalently complex-conjugate transposed, receiving weighting matrices at the first and second receivers, respectively.

The weighting matrices could be determined by, e.g., Zero Forcing or MMSE (Minimum Mean Square Error). Irrespective of which method is used for decoding, the transmitter side weighting vectors $V_1$ and $V_2$ are adjusted in accordance with information feedback <<Adaptation Feedback 1>>, <<Adaptation Feedback 2>>. Due to the interference, the matrices $V_1$ and $V_2$ are coupled. If the interference is not dominated by the noise level there will be a noticeable effect from the interference and the rate with which it varies, e.g. in terms of coherence time.

According to the invention the problems mentioned above are eliminated or reduced by grouping of user equipment according to channel characteristics. The various groups are allocated different orthogonal channels such that the impact of rapidly varying channels on slowly varying channels is eliminated or substantially reduced. User equipment is continuously monitored and when its channel characteristics change, it is reallocated accordingly.

According to a further mode of the invention different kinds of transmission diversity are adopted for the different groups. The greater the change rate of the channel characteristics, the less sensitive the transmission diversity scheme selected. Some diversity schemes or principles, e.g. Alamouti diversity or space-time coding, are not dependent on channel state information at all. Diversity schemes of these kinds are adopted for the groups of channel characteristics of highest change rate.

Even if user equipment within a group can interfere, the change rate, e.g. in terms of coherence time, of the interference is in the same order of magnitude as the interfered communications and consequently no increase in feedback update rate is required.

The change rate of channel characteristics can be determined on either side of a communication link, transmitter side as well as receiver side. It could also be determined with or without assistance data from the other side.

The preferred measure of change rate is the inverse of coherence time. The invention, however, is not restricted to coherence time estimates. Another example of estimating change rate is in relation to fixed thresholds, the change rate thresholds defining change rate range limits of the various groups. Correlation estimates over respective time intervals greater and smaller than the thresholds determine whether it should be classified to a group of higher or lower change rate.

Below are described implementations of receiver assisted initiation of change of groups, receiver initiated change of groups and transmitter initiated change rate based on reverse channel properties.

Figure 3:
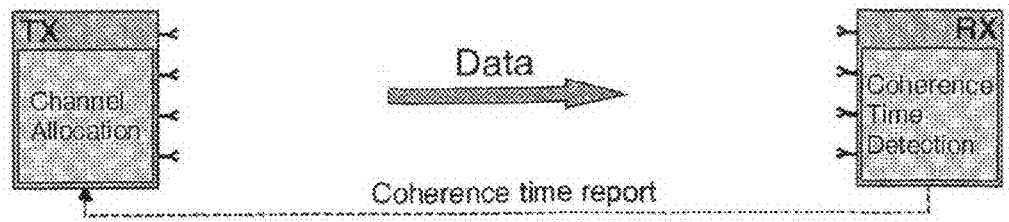
FIG. 3 schematically illustrates receiver-assisted initiation of change of groups according to the invention.

FIG. 3 schematically illustrates receiver-assisted initiation of change of groups. Transmitter <<TX>> comprises processing means arranged for scheduling transmissions on a communications resource of a particular group <<Channel Allocation>> as allocated by the processing means or a control unit (not illustrated) controlling the transmitter. The transmitter <<TX>> sends data <<Data>> on the communications resource/channel to a receiver <<RX>>. The receiver <<RX>> comprises a detector for detecting or estimating the rate at which the channel characteristics changes <<Coherence Time Detector>>. As earlier mentioned, the preferred measure of change rate of channel characteristics is the reciprocal of coherence time. The detected change rate of channel characteristics, or corresponding measure, is fed back as assistance information <<Coherence time report>> from the receiver <<RX>> to the transmitter <<TX>>, the receiver entity <<RX>> also comprises a transmitter sending feedback information and the transmitter entity <<TX>> also comprises a receiver receiving feedback information. The feedback information received on transmitter side is input for group (re-)allocation according to the detected change rate at receiver side.

Figure 4:
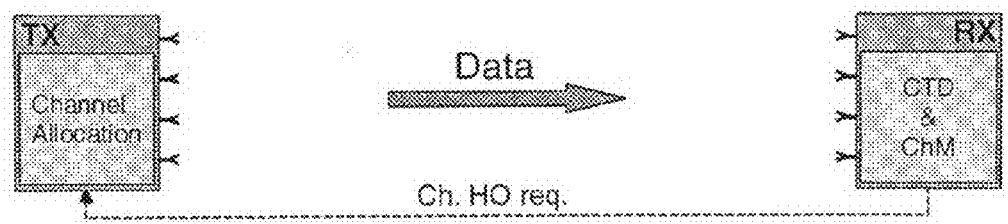
FIG. 4 illustrates receiver-determined change of groups according to the invention.

FIG. 4 illustrates receiver-determined change of groups. The receiver <<RX>> measures and estimates channel characteristics change rate, preferably in terms of coherence time <<CTD>>, of a communication link in consideration. For this purpose it includes processing means. Based on the channel characteristics change rate, detects whether future communications of the communication link should be (re-)allocated to a candidate channel group or a particular channel <<ChM>>. It then issues a channel handover request <<Ch. HO req.>>, urging for a channel change as need be, to the transmitter side, at which side the final channel allocation <<Channel Allocation>> is made considering other potential handover requests.

For transmitting channel handover requests <<Ch. HO req.>> the receiver entity <<RX>> also comprises transmitting means and the transmitting <<TX>> comprises receiving means <<RX>> for receiving the feedback information.

An advantage of the embodiment of FIG. 4 over the embodiment of FIG. 3 is relaxed communications on the feedback channel as only HO requests need be transmitted and not frequent channel state information updates. This advantage is achieved at a cost of somewhat more complex receivers and the need of information transfer to the receiver on available channels, not required in the embodiment of FIG. 3. In relation to the embodiment of FIG. 4 it is particularly advantageous to only make quantized measurements and estimates in relation to particular thresholds defining the respective group change rate range limits, as described above. When passing a threshold, a channel handover request <<Ch. HO req.>> is triggered. The one or more thresholds are stored in the receiver or transferred from the transmitter. In the latter case the transmitter can cooperatively with other transmitters adaptively determine which threshold to use according to a preferred mode of the invention. In another example mode of the invention, the transmitter independently determines which threshold to use.

Figure 5:
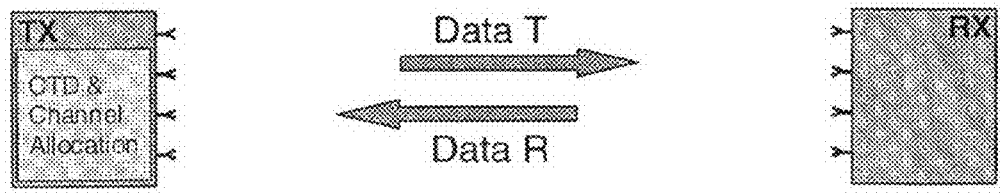
FIG. 5 illustrates an embodiment of the invention not requiring any assistance from receiver side, the communication link change rate being determined from the channel characteristics change rate of communications from receiver to transmitter for a bidirectional communication link.

FIG. 5 illustrates an embodiment not requiring any assistance from receiver side, the communication link change rate being determined from the channel characteristics change rate of communications from receiver to transmitter for a bidirectional communication link. It may appear somewhat confusing referring to entities as transmitter <<TX>> and receiver <<RX>>. The rational, however, is that the transmitter <<TX>> determines transmission channel for data transmissions <<Data T>> to the receiver based on channel characteristics of the channel on which it receives data <<Data R>>. However, even if not strictly required most systems operating with bidirectional channels allocate channels of a bidirectional communication link in predefined pairs. I.e. once either of transmitter or receiver channel is changed so is the other (receiver or transmitter) channel of the pair to which it belongs. The pairing can, e.g., be fixed frequency distances between uplink and downlink channels of FDM-based communications systems or fixed time difference of uplink and downlink time slots of TDM-based communications systems. The embodiment of FIG. 5 has an advantage compared to the embodiment of FIGS. 3 and 4 in that it is operative also in absence of feedback information, relieving a communications system of overhead in terms of feedback of channel state information. Not requiring feedback transmitted at particular intervals, group and channel (re-)allocations can be fully dynamic. There is a disadvantage when there are symmetry impairments of the respective channels in different directions. A mere frequency difference can be compensated for by a frequency transformation or, when measurements are based on coherence time, a frequency scaling of coherence time, the coherence time being proportional to transmission wavelength. According a preferred mode of the embodiment the transmitter detects or estimates coherence time <<CTD>> of the channel on which data is received <<Data R>>. Depending on the coherence time estimates, group or particular channel for data transmission <<Data T>> to the receiver <<RX>> is allocated <<Channel Allocation>> by transmitter <<TX>> or a controlling entity controlling the transmitter <<TX>>.

If transmission parameters cannot be adapted sufficiently fast in relation to channel characteristics changes, parameter changes adapting to obsolete status could deteriorate already poor channel conditions. If the channel characteristics change rate exceeds a specified rate threshold, link communications are preferably altered from rate sensitive to less rate sensitive, e.g. from requiring channel state information to not requiring channel state information. When channel characteristics change rates changes from rapid to slow, a switch of link communications from less rate sensitive to more rate sensitive, e.g. from not requiring channel state information to requiring channel state information, is preferred in order to increase performance.

Examples of such link communications rate sensitivity changes are between:
coherent diversity combining (at low channel characteristics change rates) and Alamouti diversity combining (at high channel characteristics change rates),
SVD (Singular Value Decomposition) based MIMO (at low channel characteristics change rates) and space-time block coding or layered architecture space-time based MIMO.

Coherent diversity combining requires estimates of channel phase and amplitude for optimal combining, whereas Alamouti diversity combining is well off with time-averaged path loss, averaged over time intervals substantially greater than the coherence time.

Figure 6:
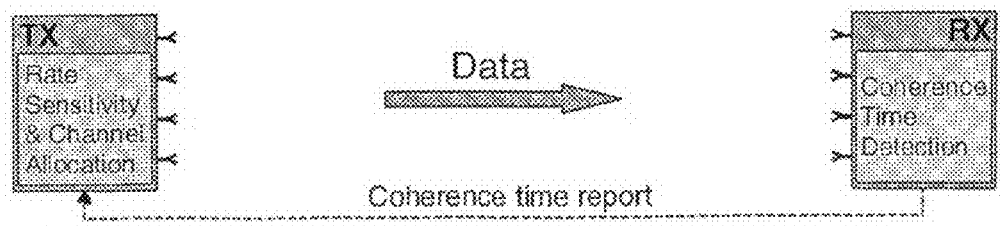
FIG. 6 illustrates a receiver-assisted embodiment enhanced with rate-based change of link communications rate sensitivity according to the invention.

FIG. 6 illustrates a receiver assisted embodiment, as of FIG. 3, enhanced with rate based change of link communications rate sensitivity <<Rate Sensitivity>>. Similarly, the embodiments of FIGS. 4 and 5 can be enhanced with rate based change of link communications rate sensitivity. For enhancement of the embodiment of FIG. 4 the change of link communications rate sensitivity is initiated at receiver side, whereas for enhancement of the embodiment of FIG. 5, it is initiated at transmitter side, in direct correspondence to FIG. 6.

According to a preferred mode of the invention, a base station of a radio communications system takes the role of transmitter and respective user equipment, served by the base station, takes the role of receiver as regards feedback assistance and channel allocation as described in relation to the embodiments in FIGS. 3-6. Preferably, the mentioned controller controlling the transmitter then corresponds to a radio network controller. For communication links in the reverse direction (from user equipment to base station), channel pairing (described in relation to FIG. 5 above) is preferably adopted.

The invention is not intended to be limited only to the embodiments described in detail above. Changes and modifications may be made without departing from the invention. It covers all modifications within the scope of the following claims.

The invention claimed is:

1. A method of multiple access communications over two or more communication links in different cells, the method comprising:
determining a variability of one or more channel characteristics of the two or more communication links in different cells, wherein each communication link is associated with a user equipment and wherein the variability is determined using correlation estimates;
changing, at a base station, a rate sensitivity of a communication link when the determined variability exceeds a rate threshold;
grouping each user equipment into either a slowly varying group or a rapidly varying group according to the determined variability of the associated communication link, wherein when the determined variability is above a higher limit a user equipment is classified as rapidly varying and when the determined variability is below a lower limit a user equipment is classified as slowly varying; and, allocating different orthogonal channels to the slowly varying and rapidly varying user equipment groups such that the impact of a user equipment in the rapidly varying group in one cell on a user equipment in the slowly varying group in a neighboring cell is eliminated or substantially reduced.

2. The method according to claim 1, wherein the communication links are radio communication channels.

3. The method according to claim 1, wherein the channels are allocated or reallocated to one of the groups such that the determined variability upon the allocation or reallocation is within the upper and lower limits of the rate of change of said one or more channel characteristics upon the allocation or reallocation.

4. The method according to claim 1, wherein the communication links are payload data communication links of user equipment of the multiple access system.

5. The method according to claim 1, wherein at least one of the two or more communication links for which variability of the one or more channel characteristics is determined provides communications quality depending on amount or rate of channel state information.

6. The method according to claim 5, wherein the channel state information is provided by means of feedback transmissions.

7. The method according to claim 1, wherein the rate sensitivity is one of coherent diversity combining, Alamouti diversity combining, Singular Value Decomposition (SVD) based MIMO, space-time block coding, or layered architecture space-time based MIMO.

8. The method of claim 1, wherein the determination of said variability comprises estimating said variability.

* * * * *